(12) United States Patent
Wang et al.

(10) Patent No.: US 12,340,570 B2
(45) Date of Patent: Jun. 24, 2025

(54) METHOD, ELECTRONIC DEVICE, AND COMPUTER PROGRAM PRODUCT FOR IMAGE SEGMENTATION

(71) Applicant: Dell Products L.P., Round Rock, TX (US)

(72) Inventors: Zijia Wang, WeiFang (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 501 days.

(21) Appl. No.: 17/829,658

(22) Filed: Jun. 1, 2022

(65) Prior Publication Data

US 2023/0343076 A1  Oct. 26, 2023

(30) Foreign Application Priority Data

Apr. 22, 2022  (CN) .......................... 202210432230.X

(51) Int. Cl.
*G06V 10/776* (2022.01)
*G06T 7/10* (2017.01)
(Continued)

(52) U.S. Cl.
CPC .............. *G06V 10/776* (2022.01); *G06T 7/10* (2017.01); *G06V 10/764* (2022.01);
(Continued)

(58) Field of Classification Search
CPC .. G06V 10/776; G06V 10/764; G06V 10/774; G06V 10/22; G06V 10/82;
(Continued)

(56) References Cited

U.S. PATENT DOCUMENTS

| | | | |
|---|---|---|---|
| 2021/0232890 A1* | 7/2021 | Li | G06N 3/063 |
| 2023/0169150 A1* | 6/2023 | Ha | G06V 10/22 |
| | | | 382/159 |
| 2024/0265502 A1* | 8/2024 | Zhou | G06T 3/40 |

OTHER PUBLICATIONS

Q. Zhou, C. Yan, Y. Zhu, X. Bai and W. Liu, "Image labeling by multiple segmentation," 2011 18th IEEE International Conference on Image Processing, Brussels, Belgium, 2011, pp. 3129-3132, doi: 10.1109/ICIP.2011.6116329. (Year: 2011).*

(Continued)

*Primary Examiner* — Matthew C Bella
*Assistant Examiner* — Janice E. Vaz
(74) *Attorney, Agent, or Firm* — Ryan, Mason & Lewis, LLP

(57) ABSTRACT

Embodiments of the present disclosure relate to a method, an electronic device, and a computer program product for image segmentation. The method may be executed by a trained image segmentation model. The method includes: obtaining a to-be-processed image, wherein the to-be-processed image includes objects of a plurality of categories. The method further includes: selecting a to-be-discarded category in the to-be-processed image according to a recall rate of each of the plurality of categories obtained in advance. The method further includes: processing the to-be-processed image based on a plurality of remaining categories in the plurality of categories other than the to-be-discarded category to obtain a segmented image. Through the method, computing resources required for a segmentation processing task can be greatly reduced, a processing amount of image data can be reduced, and an image processing speed can be increased.

18 Claims, 6 Drawing Sheets

(51) Int. Cl.
*G06V 10/764* (2022.01)
*G06V 10/774* (2022.01)

(52) U.S. Cl.
CPC .. *G06V 10/774* (2022.01); *G06T 2207/20021* (2013.01); *G06T 2207/20081* (2013.01)

(58) Field of Classification Search
CPC ............. G06T 7/10; G06T 2207/20021; G06T 2207/20081; G06T 7/11
See application file for complete search history.

(56) References Cited

OTHER PUBLICATIONS

J. Tian et al., "Striking the Right Balance: Recall Loss for Semantic Segmentation," arXiv:2106.14917v2, Feb. 3, 2022, 7 pages. (Year: 2022).*
J. Tian et al., "Striking the Right Balance: Recall Loss for Semantic Segmentation," arXiv:2106.14917v2, Feb. 3, 2022, 7 pages.
G. Van Horn et al., "The iNaturalist Species Classification and Detection Dataset," Conference on Computer Vision and Pattern Recognition, IEEE, Jun. 2018, pp. 8769-8778.
M. A. Rahman et al., "Optimizing Intersection-Over-Union in Deep Neural Networks for Image Segmentation," International Symposium on Visual Computing, Dec. 2016, 11 pages.
K. Cao et al., "Learning Imbalanced Datasets with Label-Distribution-Aware Margin Loss," arXiv:1906.07413v2, Oct. 27, 2019, 18 pages.
Y. Cui et al., "Class-Balanced Loss Based on Effective Number of Samples," arXiv:1901.05555v1, Jan. 16, 2019, 11 pages.
B. Zhou et al., "BBN: Bilateral-Branch Network with Cumulative Learning for Long-Tailed Visual Recognition," arXiv:1912.02413v4, Mar. 10, 2020, 14 pages.
T.-Y. Lin et al., "Focal Loss for Dense Object Detection," arXiv:1708.02002v2, Feb. 7, 2018, 10 pages.
M. Berman et al., "The Lovász-Softmax Loss: A Tractable Surrogate for the Optimization of the Intersection-over-union Measure in Neural Networks," arXiv:1705.08790v2, Apr. 9, 2018, 14 pages.
C. H. Sudre et al., "Generalised Dice Overlap as a Deep Learning Loss Function for Highly Unbalanced Segmentations," arXiv:1707.03237v3, Jul. 14, 2017, 8 pages.
S. S. M. Salehi et al., "Tversky Loss Function for Image Segmentation Using 3D Fully Convolutional Deep Networks," arXiv:1706.05721v1, Jun. 18, 2017, 9 pages.
S. A. Taghanaki et al., "Combo Loss: Handling Input and Output Imbalance in Multi-Organ Segmentation," arXiv:1805.02798v6, Sep. 15, 2021, 9 pages.
A. Shrivastava et al., "Training Region-based Object Detectors with Online Hard Example Mining," arXiv:1604.03540v1, Apr. 12, 2016, 9 pages.

* cited by examiner

METHOD, ELECTRONIC DEVICE, AND COMPUTER PROGRAM PRODUCT FOR IMAGE SEGMENTATION

RELATED APPLICATION(S)

The present application claims priority to Chinese Patent Application No. 202210432230.X, filed Apr. 22, 2022, and entitled "Method, Electronic Device, and Computer Program Product for Image Segmentation," which is incorporated by reference herein in its entirety.

FIELD

Embodiments of the present disclosure relate to the field of image processing, and in particular, to a method, an electronic device, and a computer program product for image segmentation for category-unbalanced images.

BACKGROUND

In an image processing task (e.g., an image segmentation task), category unbalance has always been a difficult problem. Image category unbalance refers to a large difference in ratios (a quantity ratio and a size ratio) of samples of different categories. Such image category imbalance can arise in situations in which samples are difficult to collect or numbers of sample examples are small. For example, in an autonomous driving task, sizes of objects such as pedestrians and obstacles in images are very small compared to sizes of one or more other objects such as a road. For another example, since some rare species have a small number of members, the number of samples of the rare species that can be collected is relatively small as well. Therefore, how to identify these unbalanced categories is an important issue in current computer-vision image processing tasks.

SUMMARY

Embodiments of the present disclosure provide a method, an electronic device, and a computer program product for image segmentation, and embodiments of the present disclosure further provide a training method, an electronic device, and a computer program product for an image segmentation model.

According to a first aspect of the present disclosure, a method for image segmentation is provided and is executed by a trained image segmentation model. The method includes: obtaining a to-be-processed image, wherein the to-be-processed image includes objects of a plurality of categories. The method further includes: selecting a to-be-discarded category in the to-be-processed image according to a recall rate of each of the plurality of categories Obtained in advance. The method further includes: processing the to-be-processed image based on a plurality of remaining categories in the plurality of categories other than the to-be-discarded category to obtain a segmented image.

According to a second aspect of the present disclosure, an electronic device is provided. The electronic device includes at least one processor; and a memory, coupled to the at least one processor and having instructions stored thereon, wherein the instructions, when executed by the at least one processor, cause the device to execute actions including: obtaining a to-be-processed image, wherein the to-be-processed image includes objects of a plurality of categories; selecting a to-be-discarded category in the to-be-processed image according to a recall rate of each of the plurality of categories obtained in advance; and processing the to-be-processed image based on a plurality of remaining categories in the plurality of categories other than the to-be-discarded category to obtain a segmented image.

According to a third aspect of the present disclosure, a computer program product is provided. The computer program product is tangibly stored on a non-transitory computer-readable medium and includes machine-executable instructions, and the machine-executable instructions, when executed by a machine, cause the machine to execute steps of the method in the first aspect of the present disclosure.

According to a fourth aspect of the present disclosure, a method for training an image segmentation model is provided. The method includes: obtaining a sample image set, wherein the sample image set includes objects of a plurality of categories, wherein the plurality of categories includes unbalanced categories. The method further includes: obtaining recall rate change of each of the plurality of categories by using the image segmentation model. The method also includes selecting a category with a weight to be adjusted according to the recall rate change of each category. The method further includes adjusting the weight of the category with the weight to be adjusted, and training the image segmentation model to obtain a trained image segmentation model.

According to a fifth aspect of the present disclosure, an electronic device is provided. The electronic device includes at least one processor; and a memory, coupled to the at least one processor and having instructions stored thereon, wherein the instructions, when executed by the at least one processor, cause the device to execute actions including: obtaining a sample image set, wherein the sample image set includes objects of a plurality of categories, wherein the plurality of categories includes unbalanced categories; obtaining recall rate change of each of the plurality of categories by using the image segmentation model; selecting a category with a weight to be adjusted according to the recall rate change of each category; and adjusting the weight of the category with the weight to be adjusted, and training the image segmentation model to obtain a trained image segmentation model.

According to a sixth aspect of the present disclosure, a computer program product is provided. The computer program product is tangibly stored on a non-transitory computer-readable medium and includes machine-executable instructions, wherein the machine-executable instructions, when executed by a machine, cause the machine to execute steps of the method in the fourth aspect of the present disclosure.

BRIEF DESCRIPTION OF THE DRAWINGS

By more detailed description of exemplary embodiments of the present disclosure, provided herein with reference to the accompanying drawings, the above and other objectives, features, and advantages of the present disclosure will become more apparent, where identical reference numerals generally represent identical components in the exemplary embodiments of the present disclosure.

In all the accompanying drawings, identical or corresponding numerals represent identical or corresponding parts.

DETAILED DESCRIPTION

Figure 1:
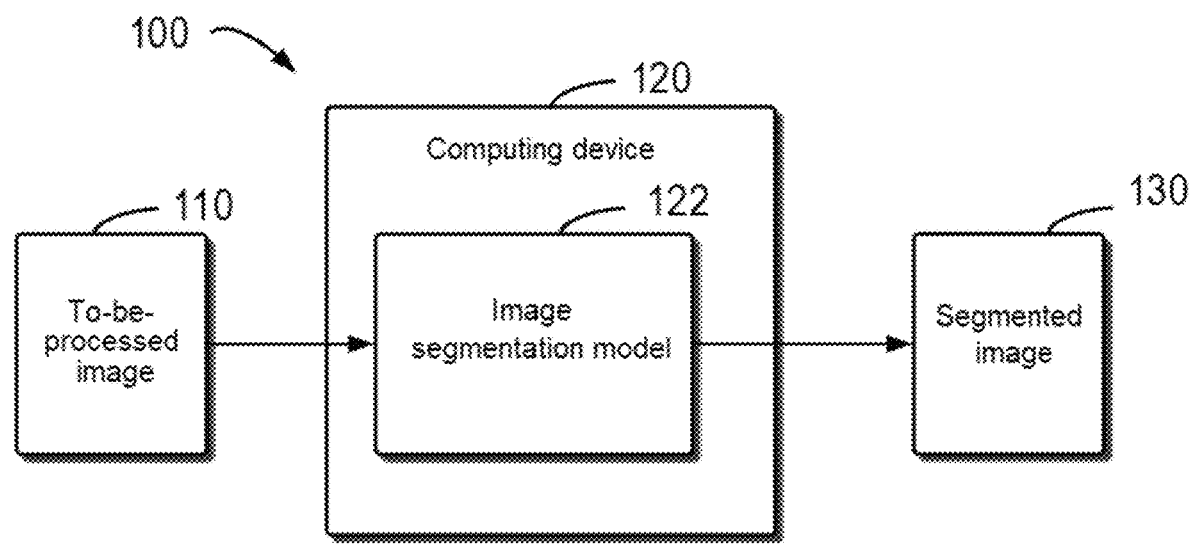
FIG. 1 illustrates a schematic diagram of an exemplary environment in which a device and/or a method can be implemented according to an embodiment of the present disclosure.

Embodiments of the present disclosure will be described in more detail below with reference to the accompanying drawings. Although the accompanying drawings show some embodiments of the present disclosure, it should be understood that the present disclosure can be implemented in various forms, and should not be viewed as being limited to the embodiments stated herein. Instead, these embodiments are provided for understanding the present disclosure more thoroughly and completely. It should be understood that the accompanying drawings and the embodiments of the present disclosure are for illustrative purposes only, and are not intended to limit the protection scope of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may further be included hereunder.

In an image segmentation task, category unbalance is usually processed based on designing a balanced loss function. There are three main forms of loss function balancing methods: a loss function based on regional balance, a loss function based on statistical balance, and a loss function based on performance balance. In the loss function method based on regional balance, intersection-over-union (IoU) is mainly taken as an evaluation measurement parameter. For a category unbalance task, considering "false positive" and "false negative" in the category unbalance task, a high average accuracy can also be obtained in the existing design even with a low average IoU, which apparently cannot solve the category unbalance task. In the loss function method based on statistical balance, a weight is adjusted by an inverse frequency cross-entropy loss. This method needs to change a network in some cases and needs to optimize an iterative process, so this method is not suitable for the image segmentation task. The loss function based on performance balance is mainly used in an object detection task, and research shows that the method cannot be very successfully applied in other tasks of image processing.

In order to solve at least the above and other potential problems, an embodiment of the present disclosure provides a method for image segmentation, and the method is executed by a trained image segmentation model. The method includes: obtaining a to-be-processed image, wherein the to-be-processed image includes objects of a plurality of categories. The method further includes: selecting a to-be-discarded category in the to-be-processed image according to a recall rate of each of the plurality of categories obtained in advance. The method further includes: processing the to-be-processed image based on a plurality of remaining categories in the plurality, of categories other than the to-be-discarded category to obtain a segmented image. Through the method, the amount of image data that needs to be processed is reduced, computing requirements of the task are reduced, and a more accurate segmentation result can be obtained for an image processing task with unbalanced categories.

Embodiments of the present disclosure will be further described in detail below with reference to the accompanying drawings. FIG. 1 illustrates a schematic diagram of exemplary environment 100 in which embodiments of the present disclosure can be implemented.

Exemplary environment 100 includes computing device 120, computing device 120 includes image segmentation model 122, and image segmentation model 122. is a trained image segmentation model. Computing device 120 is configured to receive to-be-processed image 110 and perform segmentation processing on to-be-processed image 110 through image segmentation model 122 to obtain segmented image 130.

In exemplary environment 100, to-be-processed image 110 may be obtained by various types of image collection devices, and the image collection devices may be integrated with computing device 120 or separate from computing device 120. To-be-processed image 110 may include an image collected in real time by an image collection device integrated in computing device 120, may also include an image received through a network or other transmission media, and may further include an image read by accessing a storage medium. A source of to-be-processed image 110 is not limited in the present disclosure. In one embodiment, to-be-processed image 110 includes the Objects of the plurality of categories.

In one embodiment, image segmentation model 122 is trained, and a sample image set used to train image segmentation model 122 includes the objects of the plurality of categories, and these objects of the plurality of categories include unbalanced categories, that is, there is a relatively large difference in ratios (a quantity ratio and a size ratio) of samples of different categories in the sample image set.

Computing device 120 includes, but is not limited to, a personal computer, a server computer, a handheld or laptop device, a mobile device (such as a mobile phone, a personal digital assistant (PDA), and a media player), a multi-processor system, a consumer electronic product, a wearable electronic device, an intelligent home device, a minicomputer, a mainframe computer, an edge computing device, a distributed computing environment including any of the above systems or devices, etc.

Computing device 120 receives to-be-processed image 110. Computing device 120 includes image segmentation model 122. Image segmentation model 122 is trained, and the to-be-discarded category may be selected in to-be-processed image 110 according to the recall rate of each of the plurality of categories obtained in advance. Then, image segmentation model 122 processes to-be-processed image 110 based on the plurality of remaining categories in the plurality of categories other than the to-be-discarded category to obtain segmented image 130.

Through the method, the amount of the image data that needs to be processed is reduced, and the computing requirement of the task is reduced. Therefore, the image segmentation method according to an embodiment of the present disclosure can also be deployed in an edge device, so that the image may be subjected to image segmentation with higher security, lower latency, and higher reliability. Moreover, the trained image segmentation model according to an embodiment of the present disclosure can obtain more accurate segmentation for the image processing task with the unbalanced categories.

Figure 2:
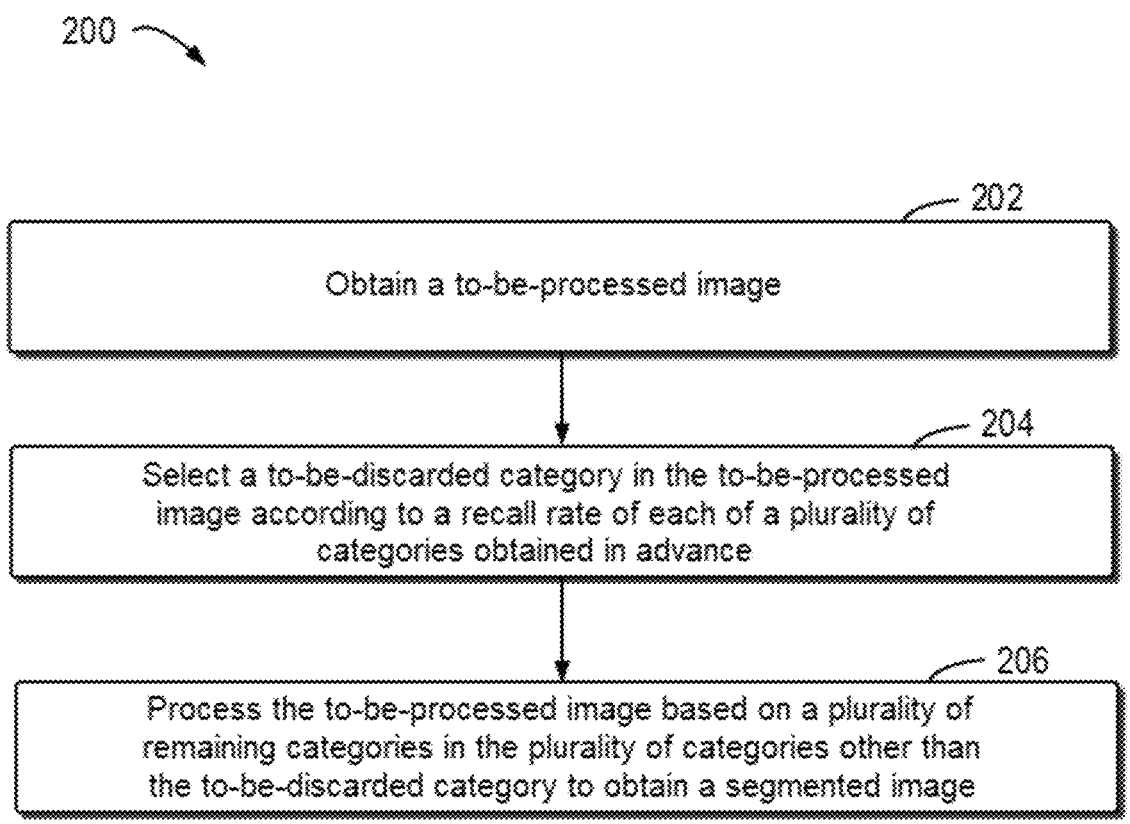
FIG. 2 illustrates a flow chart of a method for image segmentation according to an embodiment of the present disclosure.

A block diagram of exemplary environment 100 in which embodiments of the present disclosure can be implemented has been described above with reference to FIG. 1. A flow chart of method 200 for image segmentation according to an embodiment of the present disclosure will be described below with reference to FIG. 2. Method 200 may be executed at computing device 120 in FIG. 1 and any suitable computing device.

Figure 3A:
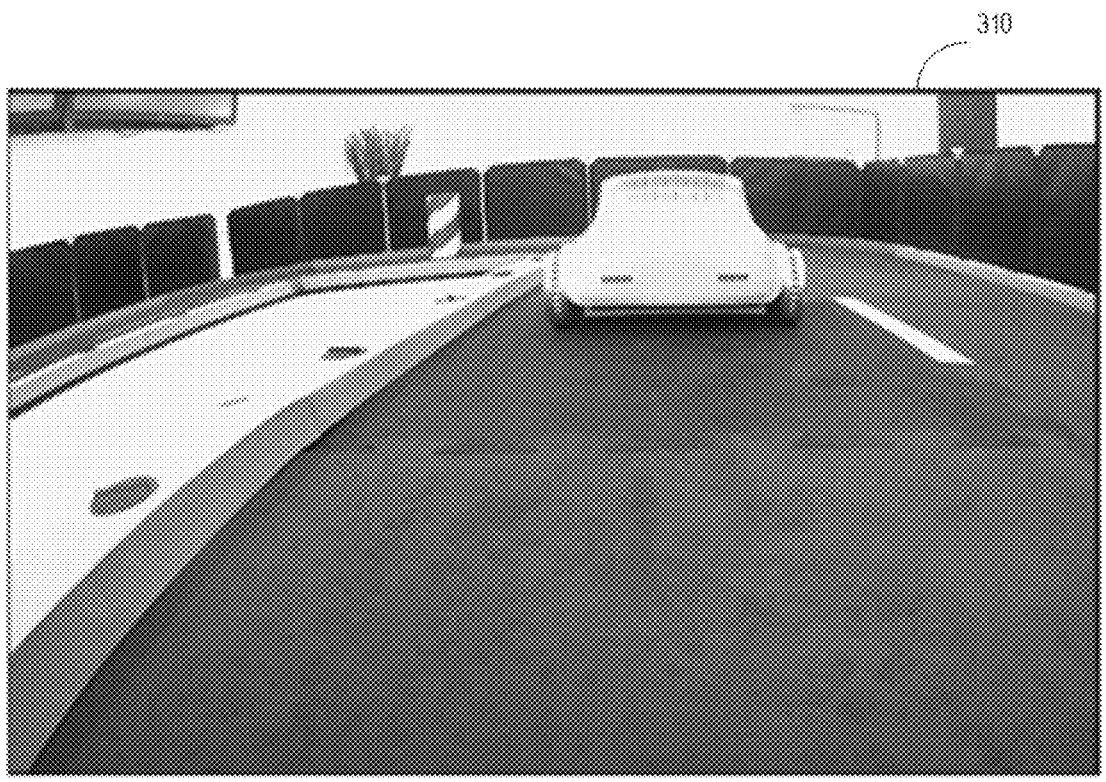
FIG. 3A illustrates an exemplary diagram of a to-be-processed image according to an embodiment of the present disclosure.

At block 202, computing device 120 may obtain to-be-processed image 110, wherein the to-be-processed image includes objects of a plurality of categories. For example, FIG. 3A shows an example of to-be-processed image 310. The to-be-processed image in the example includes the objects of the plurality of categories, for example, includes objects of a plurality of categories such as cars, roads, traffic lines, curbs, and obstacles on the roads. It should be understood that the example in FIG. 3A is only schematic, and the present disclosure does not limit the specific content of to-be-processed image 110.

At block 204, computing device 120 may select a to-be-discarded category in to-be-processed image 110 according to a recall rate of each of the plurality of categories obtained in advance.

The recall rate represents a proportion of the number of samples accurately predicted as positive samples to the total number of the positive samples. The lower the recall rate, the lower the proportion of the number of samples accurately predicted as positive samples of the corresponding category to the total number of the positive samples. In one embodiment, for the to-be-processed image including unbalanced categories, computing device 120 may select the to-be-discarded category in to-be-processed image 110 according to the recall rate of each of the plurality of categories obtained in advance. In one embodiment, computing device 120 may determine a category with the lowest recall rate as the to-be-discarded category.

In one embodiment, computing device 120 may obtain a plurality of recall rates, wherein the plurality of recall rates respectively correspond to the recall rates of the plurality of categories in a last iteration of a training stage. Computing device 120 determines the category with the lowest recall rate among the plurality of recall rates, and selects the determined category as the to-be-discarded category.

In another alternative embodiment, computing device 120 may further obtain a plurality of recall rates, wherein the plurality of recall rates respectively correspond to the recall rates of the plurality of categories in the last iteration of the training stage. Computing device 120 may further obtain a plurality of precision rates, wherein the plurality of precision rates respectively correspond to precision rates of the plurality of categories in the last iteration of the training stage. After obtaining the plurality of recall rates and the plurality of precision rates, computing device 120 determines a category with the lowest recall rate among the plurality of recall rates and with the highest precision rate among the plurality of precision rates, and selects the determined category as the to-be-discarded category.

Precision rate indicates how many of the predicted positive samples are real positive samples, and reflects capability of a model to correctly predict the positive samples. By considering the recall rate and precision rate, computing device 120 may select a category that is overconfident but is low in accuracy rate for being actually predicted as positive samples as the to-be-discarded category, so as to be able to more accurately take a category having low relevance with target classification in unbalanced classification as the to-be-discarded category, thereby reducing the processing amount of image data, reducing the computing requirement of the task, and increasing speed of image processing.

After selecting the to-be-discarded category, image segmentation model 122 may discard a weight, connection, and computation associated with the to-be-discarded category at the time of prediction, so that no segmentation processing is performed on the to-be-discarded category.

Taking to-be-processed image 310 in FIG. 3A as an example, according to the recall rate of each category obtained in advance (for example, the recall rate of each category in to-be-processed image 310 in FIG. 3A in the last iteration of the training stage), it is assumed that the recall rate of the road category is the lowest, and then computing device 120 may select the road category as the to-be-discarded category. In this way, when image segmentation model 122 performs segmentation processing on to-be-processed image 310, the weight, connection, and calculation of the road are all discarded.

Similarly, in a case of further considering the precision rate, the to-be-processed image in to-be-processed image 310 in FIG. 3A is still taken as an example for illustration. According to the recall rate of each category obtained in advance (for example, the recall rate of each category in to-be-processed image 310 in FIG. 3A in the last iteration of the training stage) and the precision rate for each category (for example, the precision rate of each category in to-be-processed image 310 in FIG. 3A in the last iteration of the training stage), it is assumed that the recall rate of the road category is the lowest and the precision rate of the road category is also the lowest, and then computing device 120 may select the road category as the to-be-discarded category. In this way, when image segmentation model 122 performs segmentation processing on to-be-processed image 310, the weight, connection, and calculation of the road are all discarded.

At block 206, computing device 120 may perform segmentation processing on the to-be-processed image based on a plurality of remaining categories, other than the to-be-discarded category, among the plurality of categories in to-be-processed image 110, so as to obtain segmented image 130.

Figure 3B:
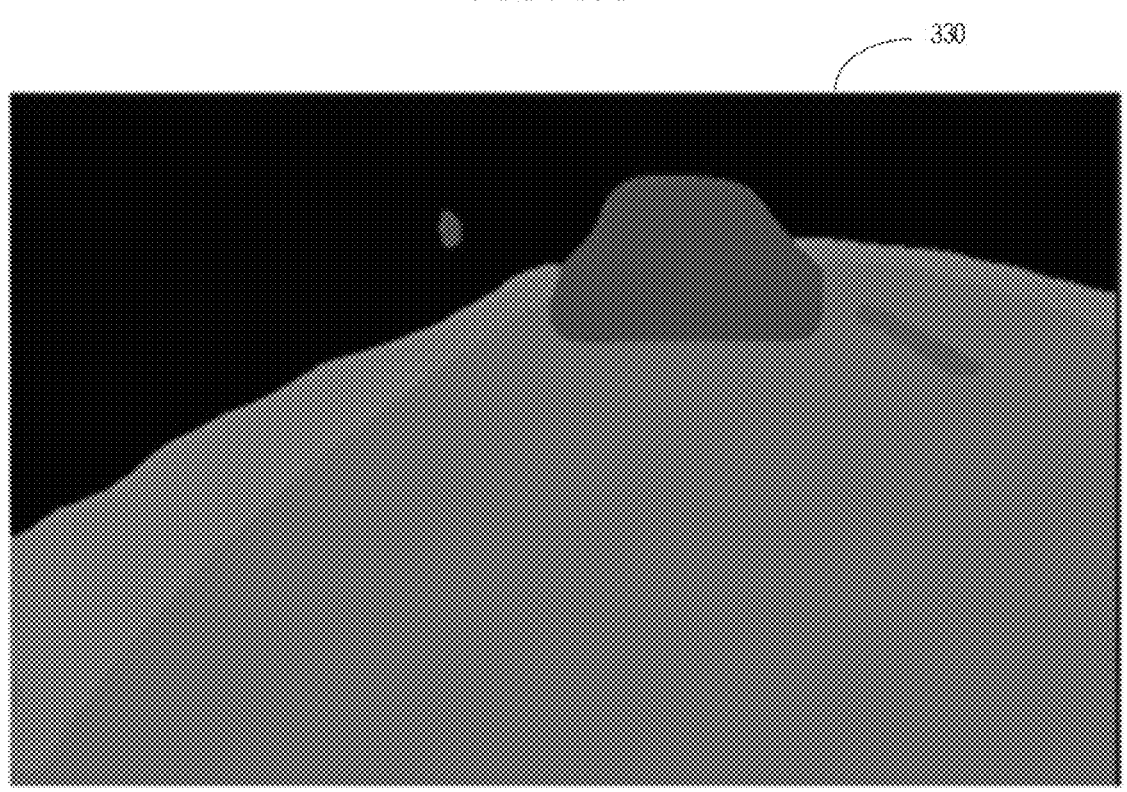
FIG. 3B illustrates an exemplary diagram of a segmented image according to an embodiment of the present disclosure.

Taking to-be-processed image 310 in FIG. 3A as an example, image segmentation model 122 performs segmentation processing based on categories other than the road category in to-be-processed image 310 to obtain segmented image 330, as shown in FIG. 3B.

Through image segmentation method 200 according to an embodiment of the present disclosure, the computing resources required for segmentation processing can be greatly reduced, the amount of image data processing can be reduced, and the image processing speed can be increased. Therefore, the image segmentation method according to an embodiment of the present disclosure can further be suitable for deployment in an edge device, so that the image can be subjected to segmentation processing with higher security, lower latency, and higher reliability. Moreover, the trained image segmentation model according to an embodiment of the present disclosure can obtain more accurate segmentation for an image processing task with unbalanced categories.

In one embodiment, in order to further reduce the data processing amount of image segmentation model 122 and increase the image processing speed, image segmentation method 200 according to an embodiment of the present disclosure may further include determining a non-labeled category according to a confidence level, and not labeling the non-labeled category in the segmentation image, which can improve processing efficiency.

For example, in one embodiment, computing device 120 may obtain a confidence level for each remaining category in a prediction process and compare the plurality of confidence levels to a confidence level threshold. Computing device 120 may classify a remaining category corresponding to a confidence level less than the confidence level threshold among the plurality of confidence levels as the non-labeled category according to comparison results between the plurality of confidence levels and the confidence level threshold. Furthermore, in the segmented image, computing device 120 may not label the non-labeled category, that is, computing device 120 may label a segmented category other than the non-labeled category and the to-be-discarded category.

By further selecting the non-labeled category according to the confidence level, majority categories in the unbalanced categories may be selected. Generally, for the image processing of the unbalanced categories, these majority categories may be considered as categories having low relevance with target classification in the unbalanced classification. By not labeling the majority categories, the segmented image can more prominently display a target category, which is more convenient for subsequent processing, further reduces the data amount, increases the image processing speed, and improves the processing efficiency.

In one embodiment, image segmentation model 122 according to an embodiment of the present disclosure includes a trained image segmentation model, trained image segmentation model 122 is obtained by training based on a sample image set including a plurality of categories, and the plurality of categories in the sample image set includes the unbalanced categories. And further, the trained image segmentation model is trained based on recall rate change of each of the plurality of categories in the training stage, wherein the recall rate change may include a difference value of the recall rates of each category in two iterations in the training stage. A training process of image segmentation model 122 will be described in detail below with reference to the accompanying drawings. It should be understood that image segmentation model 122 is trained by adopting the sample image set including the unbalanced categories and further based on the recall rate change of each of the plurality of categories in the training stage, and image segmentation model 122 according to an embodiment of the present disclosure can obtain a more accurate segmentation result for the image processing task with the unbalanced categories.

A flow chart of method 400 for training image segmentation model 122 according to an embodiment of the present disclosure will be described below with reference to FIG. 4. Method 400 may be executed at computing device 120 in FIG. 1 or any other suitable computing devices. The present disclosure does not limit the computing device for executing training method 400. For the sake of brevity, the devices that execute training method 400 are collectively referred to as a training device in the following description, and it should be understood that the training device may include computing device 120 in FIG. 1 or any other suitable computing devices.

At block 402, the training device obtains a sample image set, and the sample image set includes objects of a plurality of categories, wherein the plurality of categories includes unbalanced categories. That is, there is a relatively large difference in ratios (a quantity ratio and a size ratio) of samples of different categories in the sample image set.

At block 404, the training device obtains recall rate change of each of the plurality of categories by using the image segmentation model.

In one embodiment, the training device may obtain a recall rate $M_{i-1,j}$ and $M_{i-2,j}$ (where j is a positive integer greater than 1 and represents a corresponding category) of each category in the previous two iterations (the $(i-2)^{th}$ iteration and the $(i-1)^{th}$ iteration) before the current iteration (the $i^{th}$ iteration) at an interval of a predetermined number of training epochs.

The predetermined number of training epochs may be determined according to training needs. In one embodiment, the predetermined number of training epochs may be 5 epochs.

The training device may determine the difference value of the recall rates in the previous two iterations as the recall rate change. That is, for the $j^{th}$ category, the difference value of the corresponding recall rate is:

$$\Delta M_j = M_{i-1,j} - M_{i-2,j} \qquad \text{(Equation 1)}$$

In addition, in an alternative embodiment, the training device may further obtain an average value of change rates of N times before the current iteration as the difference value of the corresponding recall rate.

At block 406 the training device may select a category with a weight to be adjusted according to the recall rate change of each category.

At block 408, the training device may adjust the weight of the category with the weight to be adjusted, and train the image segmentation model to obtain a trained image segmentation model.

In one embodiment, the training device selects the category with the weight to be adjusted according to the recall rate change $\Delta M_j$ of each category j. Method 500 for selecting the category with the weight to be adjusted will be described in detail below with reference to FIG. 5. Method 500 may be executed at computing device 120 in FIG. 1 or any other suitable computing devices. For the sake of brevity, the devices for executing method 500 are collectively referred to as a training device in the following description, and it should be understood that the training device may include computing device 120 in FIG. 1 or any other suitable computing devices.

At block 502, the training device may determine a difference value of the recall rate corresponding to each category to obtain a plurality of difference values.

In one embodiment, the training device may obtain the difference value $\Delta M_j$ of the recall rate corresponding to each category j through Equation 1 as described above, thereby obtaining the plurality of difference values, wherein each difference value corresponds to a category.

At block 504, the training device may sort the plurality of difference values to form a first difference value sequence and a second difference value sequence.

In one embodiment, the training device may rank the difference values of the recall rates in a descending order, so as to obtain a first sequence S1:

$$S1 = \text{Argmax}(M_{i-1,\,u} - M_{i-2,\,u}), (M_{i-1,\,2} - M_{i-2,\,2}) \ldots (M_{i-1,\,n} - M_{i-2,\,n})$$

The training equipment may rank the difference values of the recall rates in an ascending order, so as to obtain a second sequence S2:

$$S2 = \text{Argmin}(M_{i-1,\,v} - M_{i-2,\,v}), (M_{-1,\,2} - M_{i-2,\,2}) \ldots (M_{i-1,\,n} - M_{i-2,\,n})$$

It should be understood that the first sequence S1 and the second sequence S2 are illustrated above for the purpose of illustration, but this is only for the purpose of illustration. The difference values in the first sequence S1 are sorted in the descending order, and the difference values in the second sequence S2 are sorted in the ascending order.

At block 506, the training device may select at least one difference value from the first difference value sequence.

In one embodiment, the training device selects the at least one difference value from the first difference value sequence S1. For example, the training device selects one or more difference values from the first difference value sequence S1 in an order from front to back. In one embodiment, the training device selects a first difference value $\Delta M_u$ from the first difference value sequence S1 in the order from front to back, where the difference value represents a maximum difference value of the recall rates among all the difference values of the recall rates.

At block 508, the training device may select at least one second difference value from the second difference value sequence.

In one embodiment, the training device selects at least one difference value from the second difference value sequence S2. For example, one or more difference values are selected from the second difference value sequence S2 in the order from front to back. In one embodiment, the training device selects a first difference value $\Delta M_v$ from the first difference value sequence S2 in the order from front to back, where the difference value represents a minimum difference value of the recall rates among all the difference values of the recall rates.

At block 510, the training device may take a category corresponding to the at least one first difference value as a category with a first weight to be adjusted, and take a category corresponding to the at least one second difference value as a category of a second weight to be adjusted.

Continuing to take the above example for illustration, after selecting the first difference value and the second difference value at block 506 and block 508 respectively, the training device takes the category u corresponding to the first difference value $\Delta M_u$ as the category of the first weight to be adjusted, and takes the category v corresponding to the at least one second difference value $\Delta M_v$ as the category of the second weight to be adjusted.

In one alternative embodiment, the training device may further sort the plurality of difference values to form the difference value sequence (for example, the first difference value sequence S1 or the second difference value sequence S2). The training device may select the at least one first difference value in the difference value sequence according to a first order (for example, the order from front to back) and select the at least one second difference value in the difference value sequence according to a second order (for example, an order from back to front). Similarly, the training device may take the category corresponding to the first difference value as the category of the first weight to be adjusted, and take the category corresponding to the second difference value as the category of the second weight to be adjusted.

At block 512, the training device may determine a category corresponding to a larger difference value as a category with a weight to be increased and a category corresponding to a smaller difference value as a category with a weight to be reduced in the category with the first weight to be adjusted and the category with the second weight to be adjusted.

For the category corresponding to the larger difference, it may be "rewarded" by adjusting the weight (for example, increasing the weight) in the training process, so that the recall rate of the category can be improved faster with increase of the number of training iterations, which is more helpful to improve the recall rate of the image segmentation model in a prediction stage. For the category corresponding to the smaller difference, it may be considered that the improvement of the category in the training process is limited, and a proportion of the category in the training process can be reduced by reducing the weight, thereby further improving the recall rate of the image segmentation model in the prediction stage.

In one embodiment, after determining the category of the first weight to be adjusted and the category of the second weight to be adjusted, the training device may further adjust the first weight to be adjusted and the second weight to be adjusted, and train the image segmentation model to obtain the trained image processing model.

The specific implementation of the training device to adjust the weight will be described in detail below.

In one embodiment, the training device may increase the weight of the category with the weight to be increased by a predetermined value, and may reduce the weight of the category with the weight to be reduced by the predetermined value, so as to obtain an updated threshold. For example, the training device may adjust the weight according to Equations 2 and 3 below:

$$W_{i,u} = W_{i-1,u} + \beta \qquad \text{(Equation 2)}$$

$$W_{i,v} = W_{i-1,v} - \beta \qquad \text{(Equation 3)}$$

where, $W_{i,\,u}$ is the weight of the category with the weight to be increased; and $W_{i,v}$ is the weight of the category with the weight to be reduced. $\beta$ represents the change rate of the weight, and in one embodiment, $\beta$ may be determined to be 0.2.

The training device may train the image segmentation model by adjusting the weights $W_{i,u}$ and $W_{i,v}$.

Figure 4:
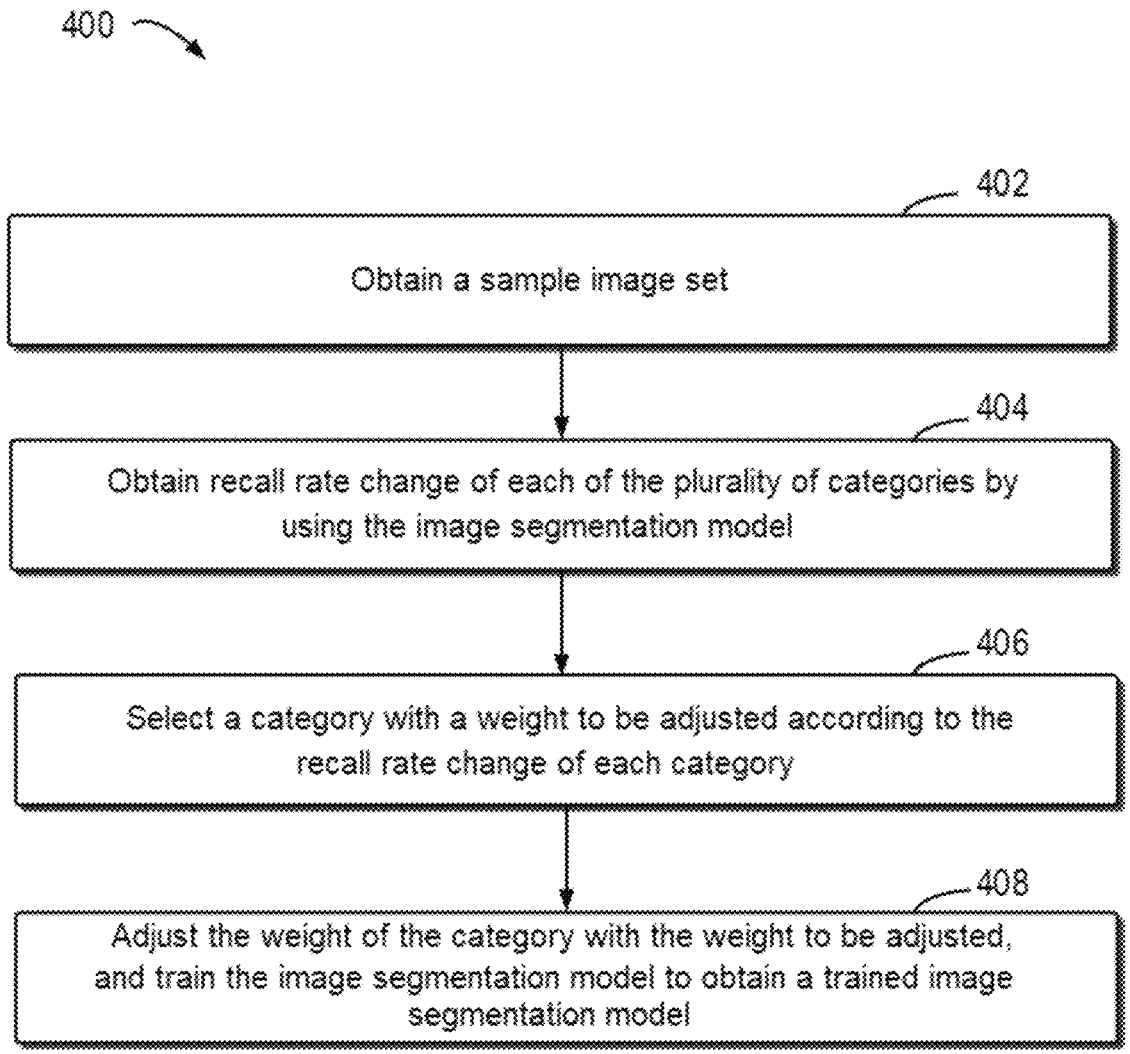
FIG. 4 illustrates a flow chart of a method for training an image segmentation model according to an embodiment of the present disclosure.
Figure 5:
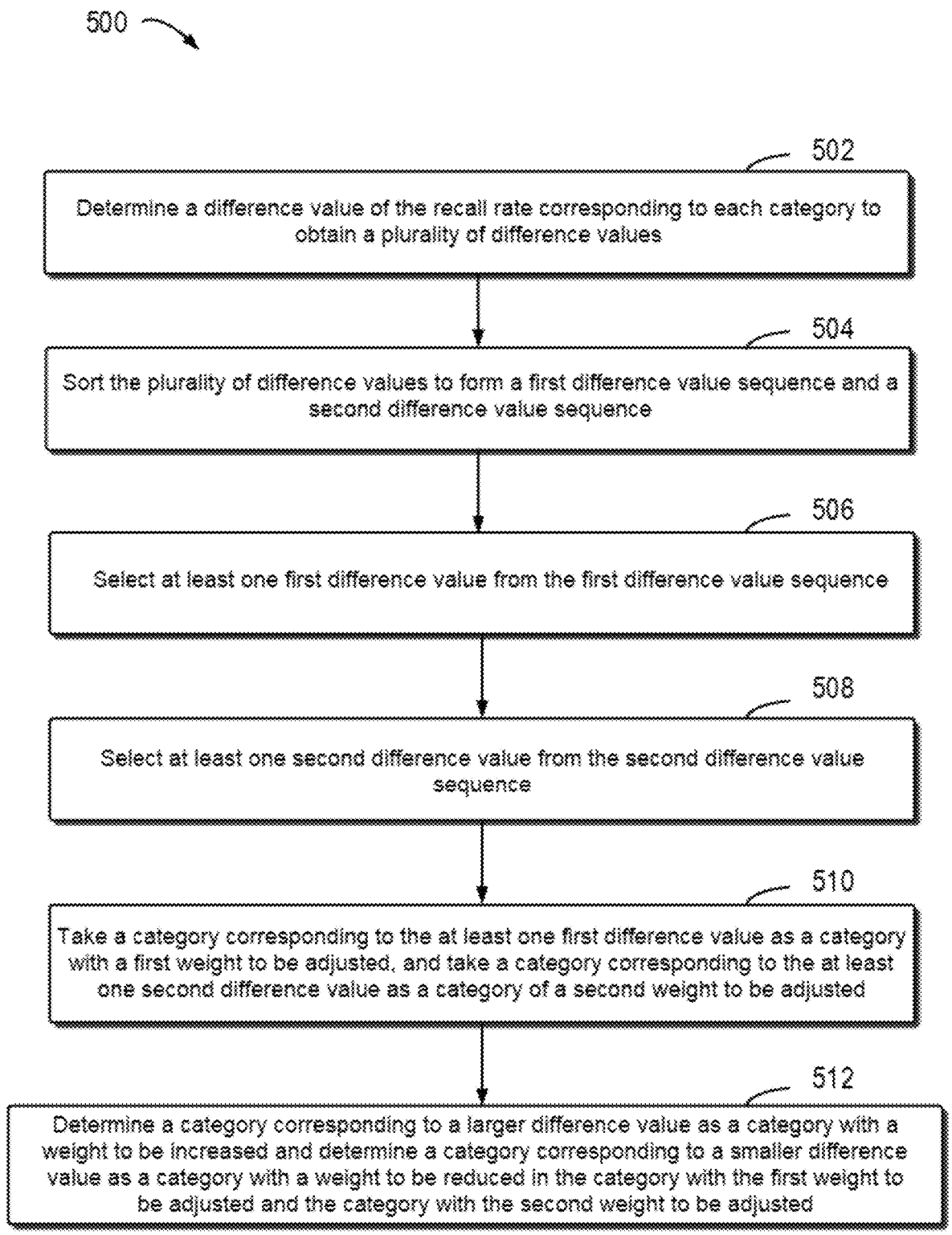
FIG. 5 illustrates a flow chart of a method for determining a category with a weight to be adjusted according to an embodiment of the present disclosure.

In one embodiment, the training device may select the category with the weight to be adjusted according to method 500 with reference to FIG. 5 at every interval of a predetermined number of training epochs, and adjust the weight through the method with reference to block 408 in FIG. 4 so as to train the image segmentation model.

By dynamically adjusting the weight in the training process, for the category corresponding to the larger difference value of the recall rate, it is "rewarded" by increasing the weight in the training process, so that the recall rate of the category can be improved faster with increase of the number of training iterations, which is more helpful to improve the recall rate of the image segmentation model in the prediction stage. For the category corresponding to the smaller difference value of the recall rate, the proportion of the category in the training process can be reduced by reducing the weight, thereby further improving the recall rate of the image segmentation model in the prediction stage.

In one embodiment, the training device may obtain a first error $E_{(training)}$ obtained after the sample image set is processed by the image segmentation model, then process the to-be-processed image by using the trained image segmentation model, and obtain a second error $E_{(testing)}$ corresponding to the to-be-processed image; and the training device completes training of the image segmentation model in response to determining that a difference value EC between the first error and the second error is less than an error change threshold (i.e., $EC=|E_{(testing)}-E_{(training)}|$, and $EC<EC_{th}$). In one embodiment, the error change threshold $EC_{th}$ may be equal to 0.1.

In addition, in one embodiment, the training device may also use the trained image segmentation model to process the to-be-processed image, and obtain the error $E_{(testing)}$ corresponding to the to-be-processed image. If the training device detects that the error $E_{(testing)}$ is not increased or improved in a consecutive predetermined number of epochs, the training device completes training of the image segmentation model. In one embodiment, the predetermined number may be $K_E=20$.

In addition, in one embodiment, the training device may also end the training of the image segmentation model after a predetermined number of epochs (e.g., 240 epochs of training).

Through the method, the amount of the image data that needs to be processed is reduced, and the computing requirement of the task is reduced. Therefore, an embodiment according to the present disclosure can further be deployed in an edge device, so that the image may be subjected to image segmentation with higher security, lower latency, and higher reliability. Moreover, the trained image segmentation model according to an embodiment of the present disclosure can obtain more accurate segmentation for an image processing task with unbalanced categories.

Figure 6:
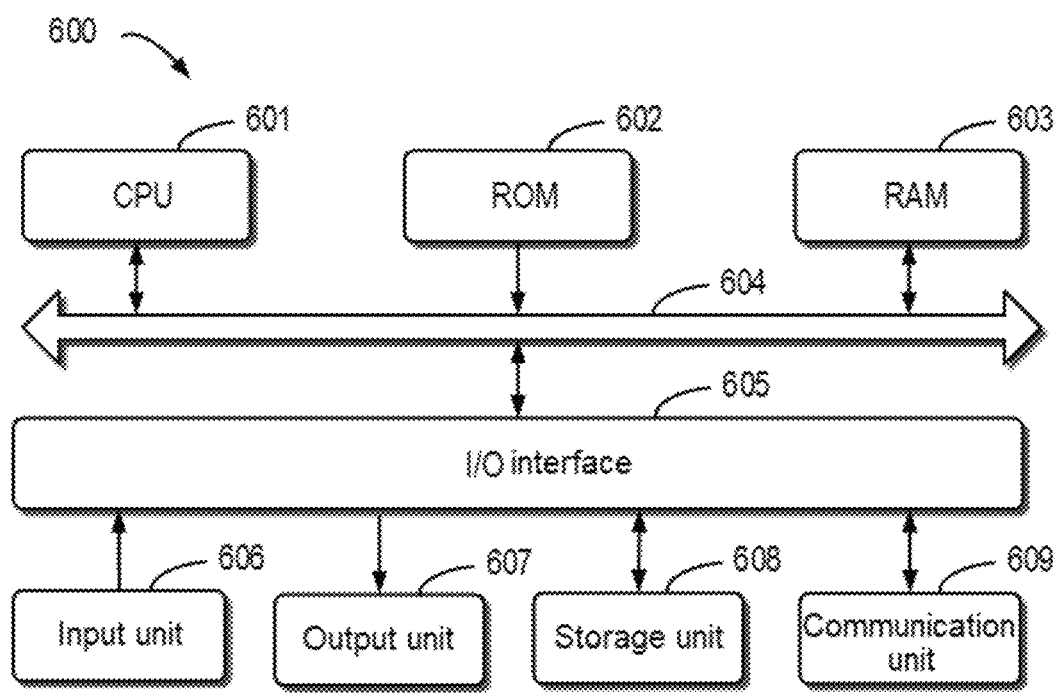
FIG. 6 illustrates a schematic block diagram of an exemplary device applicable for implementing an embodiment of the present disclosure.

FIG. 6 illustrates a schematic block diagram of example device 600 that may be used to implement embodiments of the present disclosure. Computing device 120 in FIG. 1 may be implemented by using device 600. As shown in the figure, device 600 includes central processing unit (CPU) 601 that may execute various appropriate actions and processing according to computer program instructions stored in read-only memory (ROM) 602 or computer program instructions loaded from storage unit 608 to random access memory (RAM) 603. Various programs and data required for operation of device 600 may further be stored in RAM 603. CPU 601, ROM 602, and RAMI 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

All processes and processing described above, such as method 200, method 400 and/or method 500, may be executed by CPU 601. For example, in some embodiments, method 200, method 400 and/or method 500 can be implemented as a computer software program that is tangibly contained in a machine-readable medium, for example, storage unit 608. In some embodiments, part of or all the computer program may be loaded into and/or installed onto device 600 via ROM 602 and/or communication unit 609. When the computer program is loaded into RAM 603 and executed by CPU 601, one or more actions of method 200, method 400 and/or method 500 described above may be executed.

Embodiments of the present disclosure include a method, an apparatus, a system, and/or a computer program product. The computer program product may include a computer-readable storage medium on which computer-readable program instructions for executing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any, suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not interpreted as transient signals per se, such as radio waves or other freely propagating electromagnetic waves, electromagnetic waves propagating through waveguides or other transmission media (for example, light pulses through fiber-optic cables), or electrical signals transmitted through electrical wires.

The computer-readable program instructions described herein may be downloaded from the computer-readable storage medium to all computing/processing devices or downloaded to an external computer or external storage device via a network, such as the Internet, a local area network, a wide area network, and/or a wireless network. The network may include a copper transmission cable, fiber optic transmission, wireless transmission, a router, a firewall, a switch, a gateway computer, and/or an edge server. A network adapter card or network interface in each computing/processing device receives computer-readable program instructions from a network and forwards the computer-readable program instructions for storage in a computer-readable storage medium in the computing/processing devices.

The computer program instructions for executing the operation of the present disclosure may be an assembly instruction, an instruction set architecture (ISA) instruction, a machine instruction, a machine-dependent instruction, microcode, a firmware instruction, status setting data, or source code or object code written in any combination of one or more programming languages, and the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet by using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be executed on the computer, the further programmable data processing apparatus; or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the accompanying drawings show the architectures, functions, and operations which are possibly implemented by the systems, methods, and computer program products according to a plurality of embodiments of the present disclosure. In this regard, each block in the flow charts or block diagrams may represent a module, a program segment, or part of an instruction, and the module, program segment, or part of an instruction contains one or more executable instructions for implementing specified logical functions. In sonic alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Example embodiments of the present disclosure have been described above. The above description is illustrative, rather than exhaustive, and is not limited to the disclosed embodiments. Numerous modifications and alterations will be apparent to persons of ordinary skill in the art without departing from the scope and spirit of the illustrated embodiments. The selection of terms as used herein is intended to best explain the principles and practical applications of the embodiments or technical improvements to technologies on the market, so as to enable persons of ordinary skill in the art to understand the embodiments disclosed herein.

What is claimed is:

1. An image segmentation method, executed by a trained image segmentation model, and comprising:
   obtaining a to-be-processed image, wherein the to-be-processed image comprises objects of a plurality of categories;
   selecting a to-be-discarded category in the to-be-processed image according to a recall rate of each of the plurality of categories obtained in advance; and
   processing the to-be-processed image based on a plurality of remaining categories in the plurality of categories other than the to-be-discarded category to obtain a segmented image;
   wherein selecting the to-be-discarded category in the to-be-processed image according to the recall rate of each of the plurality of categories obtained in advance comprises:
   obtaining a plurality of recall rates, wherein the plurality of recall rates respectively correspond to recall rates of the plurality of categories in at least a particular iteration of a training stage;
   determining a category based on relative values of respective ones of the plurality of recall rates; and
   selecting the determined category as the to-be-discarded category.

2. The image segmentation method according to claim 1, wherein
   the plurality of recall rates respectively correspond to the recall rates of the plurality of categories in a last iteration of the training stage; and
   wherein determining a category comprises determining a category with the lowest recall rate among the plurality of recall rates.

3. The image segmentation method according to claim 1, wherein
   the plurality of recall rates respectively correspond to the recall rates of the plurality of categories in a last iteration of the training stage;
   wherein the image segmentation method further comprises obtaining a plurality of precision rates, wherein the plurality of precision rates respectively correspond to precision rates of the plurality of categories in the last iteration of the training stage; and
   wherein determining a category comprises determining a category with the lowest recall rate among the plurality of recall rates and with the highest precision rate among the plurality of precision rates.

4. The image segmentation method according to claim 1, further comprising:
   obtaining a plurality of confidence levels, wherein the plurality of confidence levels are respectively confidence levels of the plurality of remaining categories;

comparing the plurality of confidence levels with a confidence level threshold respectively; and according to comparison between the plurality of confidence levels and the confidence level threshold respectively, classifying a remaining category corresponding to a confidence level less than the confidence level threshold among the plurality of confidence levels as a non-labeled category.

5. The method according to claim 4, further comprising: labeling a segmented category other than the non-labeled category and the to-be-discarded category in the segmented image.

6. The image segmentation method according to claim 1, wherein the trained image segmentation model is obtained by training based on a sample image set comprising the plurality of categories, and the trained image segmentation model is trained based on recall rate change of each of the plurality of categories in a training stage.

7. The image segmentation method according to claim 6, wherein the recall rate change comprises a difference value of recall rates of each category in two iterations in the training stage.

8. The image segmentation method according to claim 6, wherein the plurality of categories in the sample image set comprises unbalanced categories.

9. A method for training an image segmentation model, comprising:
obtaining a sample image set, wherein the sample image set comprises objects of a plurality of categories, wherein the plurality of categories comprises unbalanced categories;
obtaining recall rate change of each of the plurality of categories by using the image segmentation model;
selecting a category with a weight to be adjusted according to the recall rate change of each category; and
adjusting the weight of the category with the weight to be adjusted, and training the image segmentation model to obtain a trained image segmentation model;
wherein obtaining recall rate change of each of the plurality of categories comprises:
obtaining a recall rate of each category for each of multiple iterations of a training stage; and
determining for each of the plurality of categories a corresponding difference value of the recall rates of that category across the multiple iterations of the training stage; and
wherein selecting the category with the weight to be adjusted according to the recall rate change of each category comprises selecting the category based on the difference values determined for respective ones of the plurality of categories.

10. The method according to claim 9, wherein obtaining the recall rate change of each of the plurality of categories comprises:
obtaining a recall rate of each category in two previous iterations before a current iteration at an interval of a predetermined number of training epochs of the training stage; and
determining a difference value of the recall rates in the two previous iterations as the recall rate change.

11. The method according to claim 10, wherein selecting the category with the weight to be adjusted according to the recall rate change of each category comprises:
determining a difference value of the recall rate corresponding to each category to obtain a plurality of difference values;
sorting the plurality of difference values to form a first difference value sequence and a second difference value sequence;
selecting at least one first difference value from the first difference value sequence;
selecting at least one second difference value from the second difference value sequence; and
taking a category corresponding to the at least one first difference value as a category with a first weight to be adjusted, and taking a category corresponding to the at least one second difference value as a category of a second weight to be adjusted.

12. The method according to claim 11, wherein selecting the category with the weight to be adjusted according to the recall rate change of each category comprises:
determining a category corresponding to a larger difference value as a category with a weight to be increased in the category with the first weight to be adjusted and the category with the second weight to be adjusted; and
determining a category corresponding to a smaller difference value as a category with a weight to be reduced in the category with the first weight to be adjusted and the category with the second weight to be adjusted.

13. The method according to claim 12, wherein the adjusting the weight of the category with the weight to be adjusted comprises:
increasing the weight of the category with the weight to be increased by a predetermined value; and
reducing the weight of the category with the weight to be reduced by the predetermined value, wherein
the predetermined value represents a change rate of the weight of the category to be adjusted.

14. The method according to claim 9, further comprising:
obtaining a first error obtained after the sample image set is processed by the image segmentation model;
processing a to-be-processed image by using the trained image segmentation model, and obtaining a second error corresponding to the to-be-processed image; and
completing training of the image segmentation model in response to determining that a difference value between the first error and the second error is less than an error change threshold.

15. An electronic device, comprising:
at least one processor; and
at least one memory, coupled to the at least one processor and storing instructions for execution by the at least one processor, wherein the instructions, when executed by the at least one processor, cause the electronic device to execute the method according to claim 1.

16. An electronic device, comprising:
at least one processor; and
at least one memory, coupled to the at least one processor and storing instructions for execution by the at least one processor, wherein the instructions, when executed by the at least one processor, cause the electronic device to execute the method according to claim 9.

17. A computer program product, tangibly stored on a non-transitory computer-readable medium and comprising machine-executable instructions, wherein the machine-executable instructions, when executed by a machine, cause the machine to execute steps of the method according to claim 1.

18. A computer program product, tangibly stored on a non-transitory computer-readable medium and comprising machine-executable instructions, wherein the machine-executable instructions, when executed by a machine, cause the machine to execute steps of the method according to claim 9.

* * * * *